(12) United States Patent
Zhu

(10) Patent No.: US 12,021,728 B2
(45) Date of Patent: Jun. 25, 2024

(54) SYSTEM AND METHOD FOR DEBUGGING Wi-Fi SERVICE FLOW PROBLEMS

(71) Applicant: Airoha Technology (Suzhou) Limited, Suzhou (CN)

(72) Inventor: Xi-Yang Zhu, Nanjing (CN)

(73) Assignee: AIROHA TECHNOLOGY (SUZHOU) LIMITED, Suzhou (CN)

( * ) Notice: Subject to any disclaimer, the term of this patent is extended or adjusted under 35 U.S.C. 154(b) by 0 days.

(21) Appl. No.: 17/862,567

(22) Filed: Jul. 12, 2022

(65) Prior Publication Data

US 2023/0188453 A1 Jun. 15, 2023

(30) Foreign Application Priority Data

Dec. 10, 2021 (TW) .................. 110146235

(51) Int. Cl.
*H04L 43/50* (2022.01)
*H04L 43/0817* (2022.01)
*H04L 61/5014* (2022.01)

(52) U.S. Cl.
CPC .......... *H04L 43/50* (2013.01); *H04L 43/0817* (2013.01); *H04L 61/5014* (2022.05)

(58) Field of Classification Search
CPC .. H04L 43/50; H04L 43/0817; H04L 61/5014
See application file for complete search history.

(56) References Cited

U.S. PATENT DOCUMENTS

| 7,457,870 | B1* | 11/2008 | Lownsbrough | H04L 47/2433 713/153 |
| 9,547,570 | B2* | 1/2017 | Chu | H04L 41/142 |
| 9,705,795 | B2* | 7/2017 | Wang | H04L 45/56 |
| 10,165,457 | B2* | 12/2018 | Fernandez Arboleda | H04L 41/064 |
| 2014/0215443 | A1* | 7/2014 | Voccio | G06F 16/245 717/128 |

FOREIGN PATENT DOCUMENTS

| CN | 110972175 A | * | 4/2020 | ......... H04L 43/0888 |
| EP | 2204949 A2 | * | 7/2010 | ......... H04L 12/2697 |

OTHER PUBLICATIONS

C. Liu, "Visualizing Logical Correlation in Trace Data for System Debugging," in Computer, vol. 54, No. 3, pp. 28-36, Mar. 2021, doi: 10.1109/MC.2020.2984507. (Year: 2021).*

(Continued)

*Primary Examiner* — Rachel J Hackenberg
(74) *Attorney, Agent, or Firm* — BACON & THOMAS, PLLC

(57) ABSTRACT

The present invention provides a debugging system, which is embedded on a forwarding path of a module and includes a service flow matching module and a service flow debug execution module. The service flow matching module receives and analyzes a message, and determines a service flow type and a debugging mean involving the message according to a dynamic service flow type association table, wherein the dynamic service flow type association table includes a corresponding service flow type and a corresponding debugging mean involving the message. The service flow debug execution module executes the corresponding debugging means for the message according to a determination result from the service flow snatching module.

14 Claims, 8 Drawing Sheets

(56) References Cited

OTHER PUBLICATIONS

A. Makhshari and A. Mesbah, "IoT Bugs and Development Challenges," 2021 IEEE/ACM 43rd International Conference on Software Engineering (ICSE), Madrid, ES, 2021, pp. 460-472, doi: 10.1109/ICSE43902.2021.00051. (Year: 2021).*

M. Fagan, M. M. H. Khan and B. Wang, "Leveraging Cloud Infrastructure for Troubleshooting Edge Computing Systems," 2012 IEEE 18th International Conference on Parallel and Distributed Systems, Singapore, 2012, pp. 440-447, doi: 10.1109/ICPADS.2012.67. (Year: 2021).*

\* cited by examiner

SYSTEM AND METHOD FOR DEBUGGING Wi-Fi SERVICE FLOW PROBLEMS

CROSS REFERENCE TO RELATED APPLICATION

This application claims the benefits of the Taiwan Patent Application Serial Number 110146235, filed on Dec. 10, 2021, the subject matter of which is incorporated herein by reference.

BACKGROUND OF THE INVENTION

1. Field of the Invention

The present invention relates to Wi-Fi technical field, and particularly to a debugging method applicable to Wi-Fi service flow problems.

2. Description of Related Art

Gigabit Passive Optical Network (GPON) Standard is a newly developing standard, which provides users with faster data service, typically including Internet, telephone or television broadcast.

FIG. 1 is a schematic diagram of a typical passive optical fiber network 1.

A passive optical fiber network 1 includes a plurality of optical network units (ONU) 11-1 to 11-N, which are connected to an optical line terminal (OLT) 13 via a passive optical splitter 12. Downstream data are broadcasted from the OLT 13 to all the ONUs 11, and each of the ONUs 11 picks its required data. The OLT 13 allocates different time intervals to all of the ONUs 11, and each of the ONUs 11-1 to 11-3 transmits its upstream data to the OLT 13 within a time interval allocated to it. The passive optical splitter 12 divides a single line into multiple lines. Each of the ONUs 11 may be provided with its own Wi-Fi module having Wi-Fi functions.

As well known, Wi-Fi technology is widely used in communication within a short distance area. For example, EasyMesh network technology is an intelligent networking technology released by Wi-Fi Alliance. EasyMesh network technology is applicable in home and small office Wi-Fi networks.

However, as Wi-Fi technology is kept updated to a next generation, it faces higher technical complexity and accordingly occurs more technical problems. Wi-Fi technical problems mainly include three major types: function problems, performance problems and stability problems. In the aspect of exchanging messages with other network nodes, most of the performance problems and the function problems can further be categorized as service flow problems. For example, a problem of an Internet Of Things (IOT) failing to be connected to a certain terminal, a problem of a terminal DHCP failing to obtain an address, a problem of EasyMesh networking suffering packet loss or timeout of a 1905 message, a problem of a terminal multicast suffering lag, a problem of packet loss of an ARP/ping instruction, a problem of a terminal failing to roam in EasyMesh network, and so on.

Different debugging means may be used for solving service flow problems based on different functions. A typical solution for a connection problem is to activate a log printing in a connection module and perform analysis with a sniffer. A solution for a multicast problem is to look up a multicast forward table, and add log analysis according specific conditions. A general solution for an EasyMesh networking problem is to analyze log from executing process, where additional log printing is required in the case of 1905 packet loss.

As previously mentioned, it is known that Wi-Fi technical problems can be categorized as Wi-Fi service flow problems. However, most of Wi-Fi modules in an ONU lack analyzing means for service flows. Although some Wi-Fi modules have analyzing means for service flows, which however, are not standardized, and as a result, a new debugging code is required for new service flow problems, resulting in low efficiency.

In order to ensure that a new Wi-Fi technology can be employed without problems, a more efficient debugging method is required either in a development phase or in a maintenance phase of an existing network. Therefore, it is desirable to provide a debugging method for solving the aforementioned Wi-Fi service flow problems.

SUMMARY OF THE INVENTION

In view of this, there is a need to develop a debugging method that is compatible and expandable with respect to service flows in a Wi-Fi module to solve the aforementioned Wi-Fi service flow problems.

First of all, the service flows in the Wi-Fi module includes "802.11 protocol messages" and "802.3 protocol messages", wherein the 802.11 protocol messages include management frames (such as Auth, Assoc, 11KVR, Probe req, Probe Resp, and so on), control frames (such as BA frame, and so on) and some of Extensible Authentication Protocol (EAP) messages; while, the 802.3 protocol messages are practical user data, including various messages of TCP/IP protocol.

However, the technical solution of the present invention aims to treat all types of service flows as a general service flow without distinguishing a particular type of a particular service flow, and accordingly provides a debugging method that is compatible and expandable for service flows under this concept.

In summary, the method of the present invention implements a configuration that matches a service flow feature with a corresponding debugging means, thereby dynamically determining a service flow type problem and activate the corresponding debugging means.

The method of the present invention has several advantages. For example, it can execute a compatible debugging means on a service flow, and when a new problem of a service flow type occurs, it can be easily expanded to support a new debugging means.

According to one aspect of the present invention, there is provided a debugging system embedded on a forwarding path of a Wi-Fi module, which includes a service flow matching module and a service flow debug execution module. The service flow matching module receives and analyzes a message, and determines a service flow type and a debugging means involving the message according to a dynamic service flow type association table, wherein the dynamic service flow type association table includes a corresponding service flow type and a corresponding debugging means involving the message. The service flow debug execution module executes the corresponding debugging means for the message according to a determination result from the service flow matching module.

Optionally or preferably, the debugging system is embedded at one or more embedding points selected respectively on a transmitting path or a receiving path in a Wi-Fi driver.

Optionally or preferably, the one or more embedding points include a connecting point with a Linux kernel, a middle point on the forwarding path of the Wi-Fi module, or a connecting point with a Wi-Fi hardware unit.

Optionally or preferably, the service flow matching module determines a corresponding service flow involving the message by analyzing a header of the message.

Optionally or preferably, the service flow matching module looks up the dynamic service flow type association table, and accordingly matches a debug rule required by the service flow type with the one or more embedding points.

Optionally or preferably, the message is an 802.11 protocol message or an 802.3 protocol message; looking up the dynamic service flow type association table includes: looking up a Wi-Fi protocol header rule table for the 802.11 protocol message, and accordingly analyzing and obtaining sub-types of a management frame and a control frame and an EAP message of a data frame thereof; and looking up an 802.3 data matching table for the 802.3 protocol message, and accordingly analyzing headers of a second layer (MAC layer), a third layer (IP layer), and a fourth layer (TCP/UDP layer) thereof.

Optionally or preferably, the dynamic service flow type association table maps the service flow involving the message to a required debugging means, such mapping including mapping a management frame Auth service flow to a local printing debugging means; mapping an EAP service flow to a mirroring debugging means; mapping an ARP service flow to a mirroring debugging means; mapping a specific IP/port message service flow to a statistics debugging means; or mapping a DHCP message service flow to a server uploading debugging means.

Optionally or preferably, the dynamic service flow type association table is expanded to be a service property description table, and the service property description table includes three fields for a property type, a particular property and a configuration checkbox.

Optionally or preferably, a debug rule at each embedding point of the one or more embedding points is configured by its corresponding service property description table.

Optionally or preferably, in the service property description table, property types associated with the 802.3 protocol message include: a second layer MAC, a second layer protocol, a third layer IP, a third layer protocol, or a fourth layer port; property types associated with the 802.11 protocol message include: a Wi-Fi management frame, a Wi-Fi control frame, or a Wi-Fi data frame.

According to another aspect of the present invention, there is provided a debugging method, including: embedding a debugging system on a forwarding path of Wi-Fi module, wherein the debugging system includes a service flow matching module and a service flow debug execution module; receiving and analyzing the message by the service flow matching module, and determining a service flow type and a debugging means involving the message according to a dynamic service flow type association table, wherein the dynamic service flow type association table includes a corresponding service flow type and a corresponding debugging means involving the message; executing the corresponding debugging means for the message by the service flow debug execution module according to a determination result from the service flow matching module.

Optionally or preferably, the debugging system is embedded at one or more embedding points selected respectively on a transmitting path or a receiving path in a Wi-Fi driver.

Optionally or preferably, the service flow matching module determines a corresponding the service flow involving the message by analyzing a header of the message.

Optionally or preferably, the service flow matching module looks up the dynamic service flow type association table, and accordingly matches a debug rule required by the service flow type with the one or more embedding points.

Other objects, advantages, and novel features of the invention will become more apparent from the following detailed description when taken in conjunction with the accompanying drawings.

DETAILED DESCRIPTION OF THE EMBODIMENT

Different embodiments of the present invention are provided in the following description. These embodiments are meant to explain the technical content of the present invention, but not meant to limit the scope of the present invention. A feature described in an embodiment may be applied to other embodiments by suitable modification, substitution, combination, or separation.

It should be noted that, in the present specification, when a component is described to have an element, it means that the component may have one or more of the elements, and it does not mean that the component has only one of the element, except otherwise specified.

Moreover, in the present specification, the ordinal numbers, such as "first" or "second", are used to distinguish a plurality of elements having the same name, and it does not mean that there is essentially a level, a rank, an executing order, or a manufacturing order among the elements, except otherwise specified. A "first" element and a "second" element may exist together in the same component, or alternatively, they may exist in different components, respectively. The existence of an element described by a greater ordinal number does not essentially mean the existent of another element described by a smaller ordinal number.

In the present specification, a description mentioning a feature X "or" or "and/or" another feature Y means that X exists individually, Y exists individually, or X and Y exist concurrently; a description mentioning a feature X "and" another feature Y means that X and Y exist concurrently, except otherwise specified; the terms "comprise", "include", "contain", "have" means "include but not limited thereto".

Moreover, in the present specification, the terms, such as "system", "apparatus", "device", "module", or "unit", refer to an electronic element, or a digital circuit, an analogous circuit, or other general circuit, composed of a plurality of electronic elements, and there is not essentially a level or a rank among the aforementioned terms, except otherwise specified.

Moreover, a terminal or a server may include the aforementioned element(s), or be implemented in the aforementioned manner(s).

Figure 1:
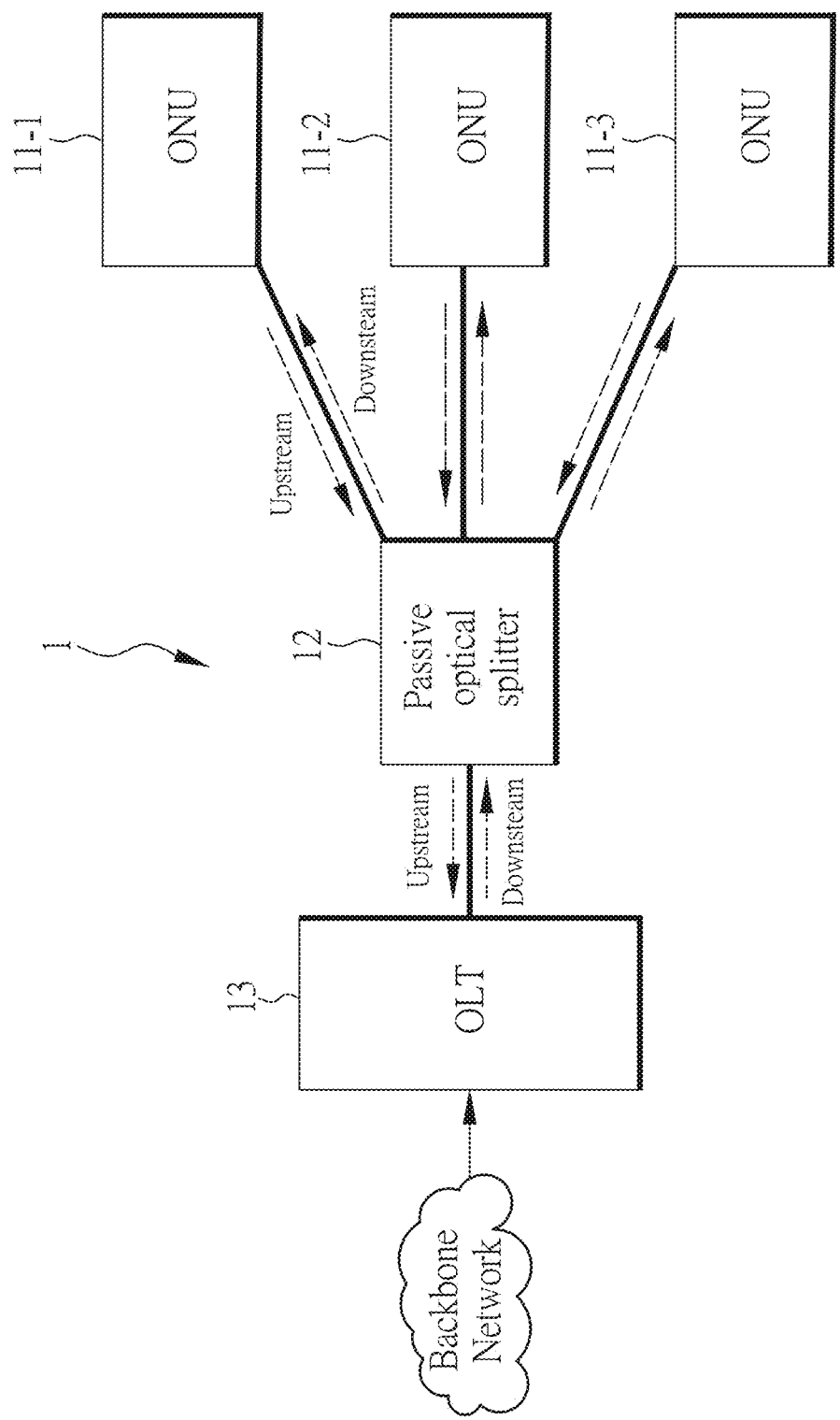
FIG. 1 is a schematic diagram of a typical passive optical fiber network.
Figure 2:
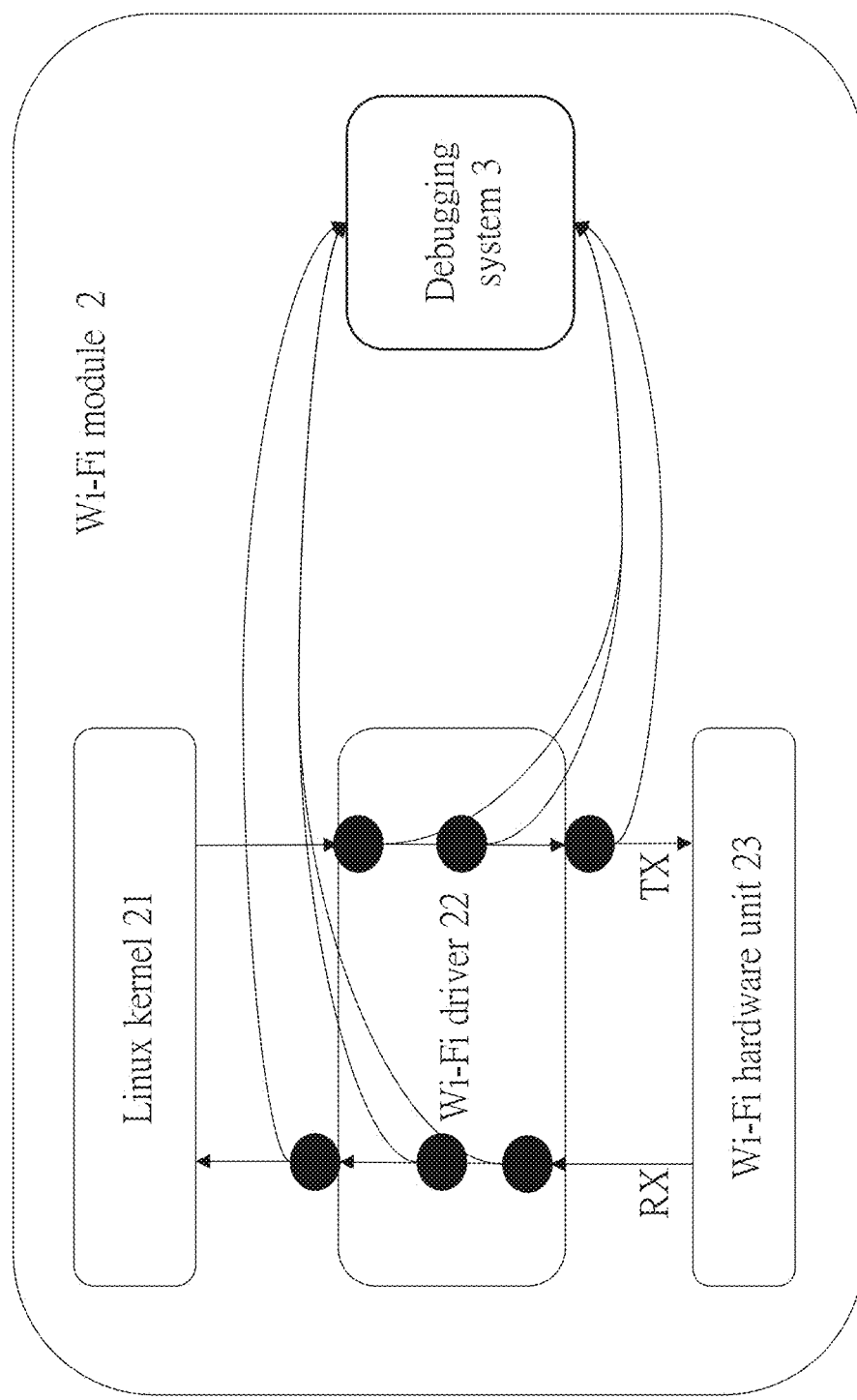
FIG. 2 is a block diagram of the Wi-Fi module according to one embodiment of the present invention.

FIG. 2 is a block diagram of the Wi-Fi module 2 according to one embodiment of the present invention.

As shown in FIG. 2, a Wi-Fi module 2 includes: a Linux kernel 21, a Wi-Fi driver 22 and a Wi-Fi hardware unit 23, wherein the Linux kernel 21 is coupled to the Wi-Fi driver 22, which in turn coupled to the Wi-Fi hardware unit 23. A message forwarding path starting from the Linux kernel 21, through the Wi-Fi driver 22, to the Wi-Fi hardware unit 23 is called a transmitting path TX. Another message forwarding path starting from the Wi-Fi hardware unit 23, through the Wi-Fi driver 22, to the Linux kernel 21 is called a receiving path RX.

A debugging system 3 of the present invention is embedded on the forwarding path in the Wi-Fi module 2. In particular, in order to add the debugging system 3 of the present invention, one or more "embedding points", or so-called "hook points" may be selected respectively on the transmitting path TX or the receiving path RX in the Wi-Fi driver 22. In this embodiment, the transmitting path TX and the receiving path RX respectively has three embedding points: a first embedding point is a connecting point with the Linux kernel 21, a second embedding point is a middle point on the forwarding path in the Wi-Fi module 2, and a third embedding point is a connecting point with the Wi-Fi hardware unit 23. Therefore, there are six embedding points in total, and the debugging system 3 of the present invention is connected to these embedding points. A debug rule at each embedding point of the six embedding points can be configured according to its own service property description table 321 (referring to FIG. 6). However, it is not necessary for every embedding point to be configured with a respective debug rule. Whether an embedding point requires a respective debug rule depends on a type of a massage for debugging. In this way, the transmitting path TX and the receiving path RX respectively has three embedding points each of which can individually be matched with a service flow and used to execute a debugging means.

Figure 3:
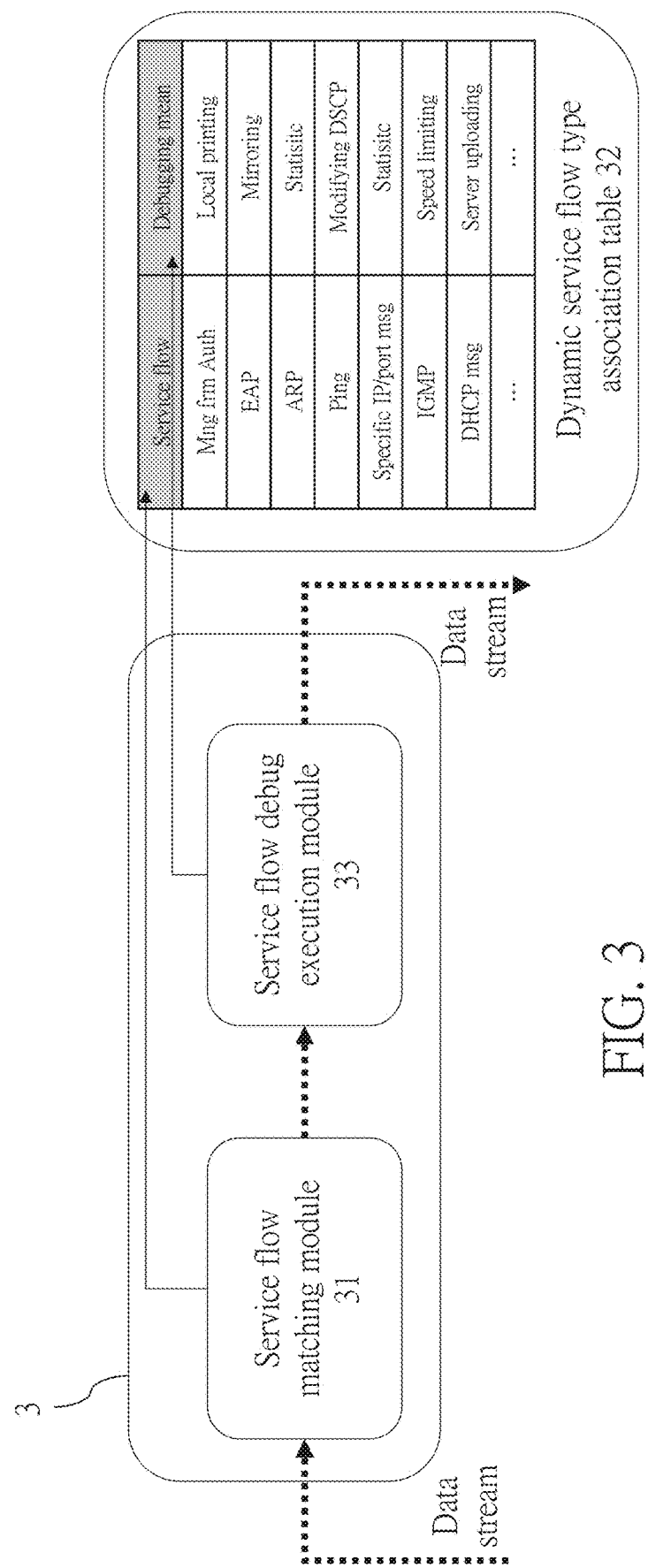
FIG. 3 is a block diagram of the debugging system according to one embodiment of the present invention.

FIG. 3 is a block diagram of the debugging system 3 according to one embodiment of the present invention.

The debugging system 3 of the present invention mainly includes: a service flow matching module 31, a dynamic service flow type association table 32 and a service flow debug execution module 33. The debugging system 3 of the present invention may be used to perform the debugging method in FIGS. 4 and 5.

The dynamic service flow type association table 32 may co-exist in the service flow matching module 31, but not limited thereto. The dynamic service flow type association table 32 is generated dynamically according to configurations required by a user. The dynamic service flow type association table 32 may be implemented by internal code programming or data structure, but not limited thereto. As shown in FIG. 3, the dynamic service flow type association table 32 maps different service flows to respective debugging means. It can be understood that the debugging means can further correspond to different debug rules.

Figure 4:
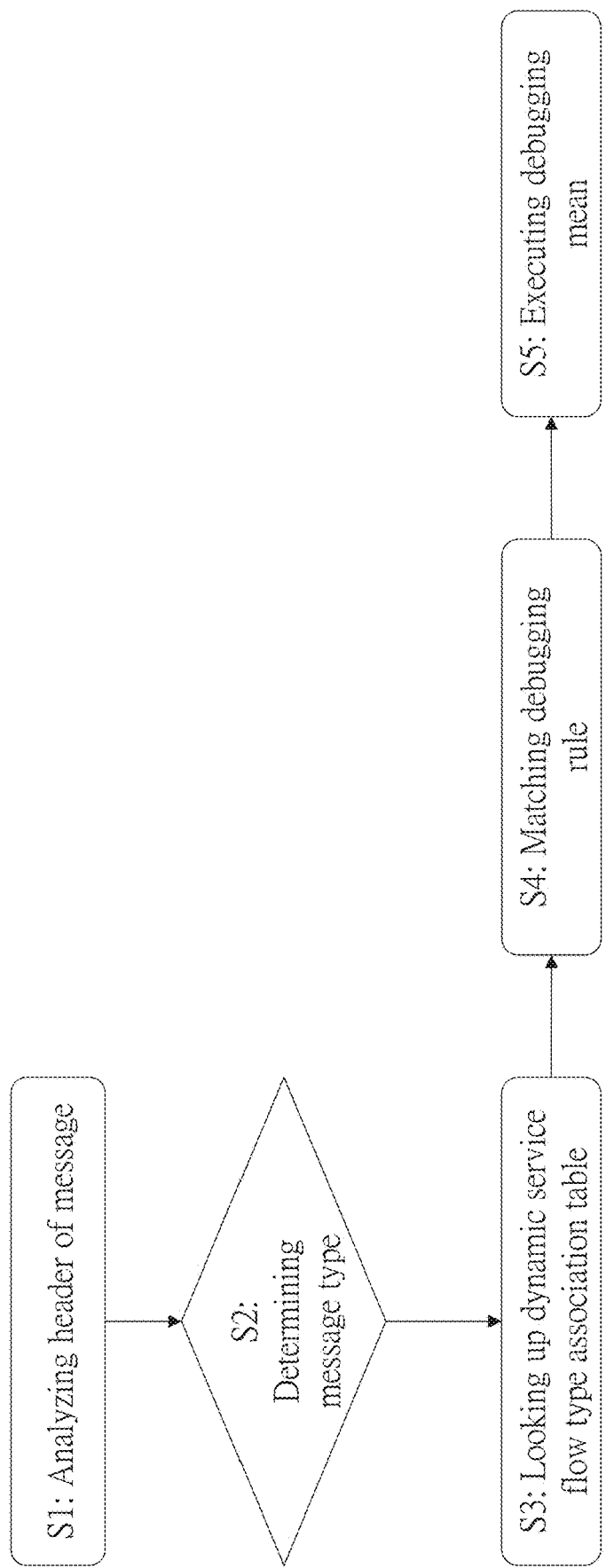
FIG. 4 is a flowchart of the debugging method according to one embodiment of the present invention.

FIG. 4 is a flowchart of the debugging method according to one embodiment of the present invention.

As shown in FIG. 3, a message (or generally a data stream) enters into the service flow matching module 31 first in order to execute a debugging process. The service flow matching module 31 analyzes a header of the message (step S1), determines which type the message belongs to and which service flow type the message involves (step S2), looks up the dynamic service flow type association table 32 (step S3), and accordingly match a debug rule required by associated service flow type on one or more embedding points selected on the message data stream path (step S4). In an embodiment of the present invention, the message data stream is the forwarding path in the Wi-Fi driver. Finally, after the debug rule is properly matched, the service flow debug execution module 33 can execute the corresponding debugging means on the data stream (step S5).

Figure 5:
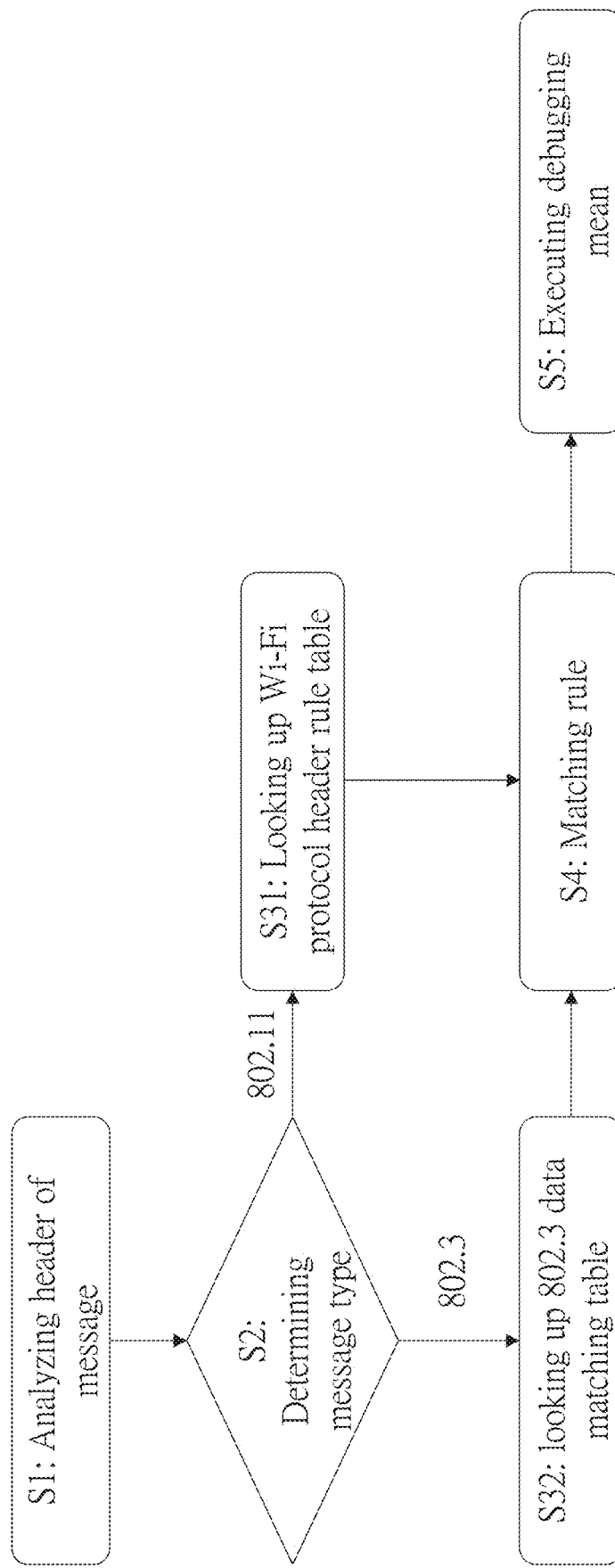
FIG. 5 is a flowchart of the debugging method according to another embodiment of the present invention.

FIG. 5 is a flowchart of the debugging method according to another embodiment of the present invention.

As previously mentioned, the service flows in the Wi-Fi module includes "802.11 protocol messages" and "802.3 protocol messages", wherein the 802.11 protocol messages include management frames, control frames and some of EAP messages; while, the 802.3 protocol messages are practical user data, including various messages of TCP/IP protocol. Therefore, the step S3 of FIG. 4, "looking up the dynamic service flow type association table" may be divided into two sub-steps S31 and S32 as shown in FIG. 5.

If the message is determined to be an 802.11 protocol message in the step S2, the sub-step S31: "looking up a Wi-Fi protocol header rule table" will be executed, and in particular, there is a need to analyze sub-types of a management frame and a control frame, and an EAP message of a data frame. If the message is determined to be an 802.3 protocol message in the step S2, the sub-step S32: "looking up an 802.3 data matching table" will be executed, and in particular, there is a need to analyze headers of a second layer (MAC layer), a third layer (IP layer), or a fourth layer (TCP/UDP layer) thereof.

Figure 6:
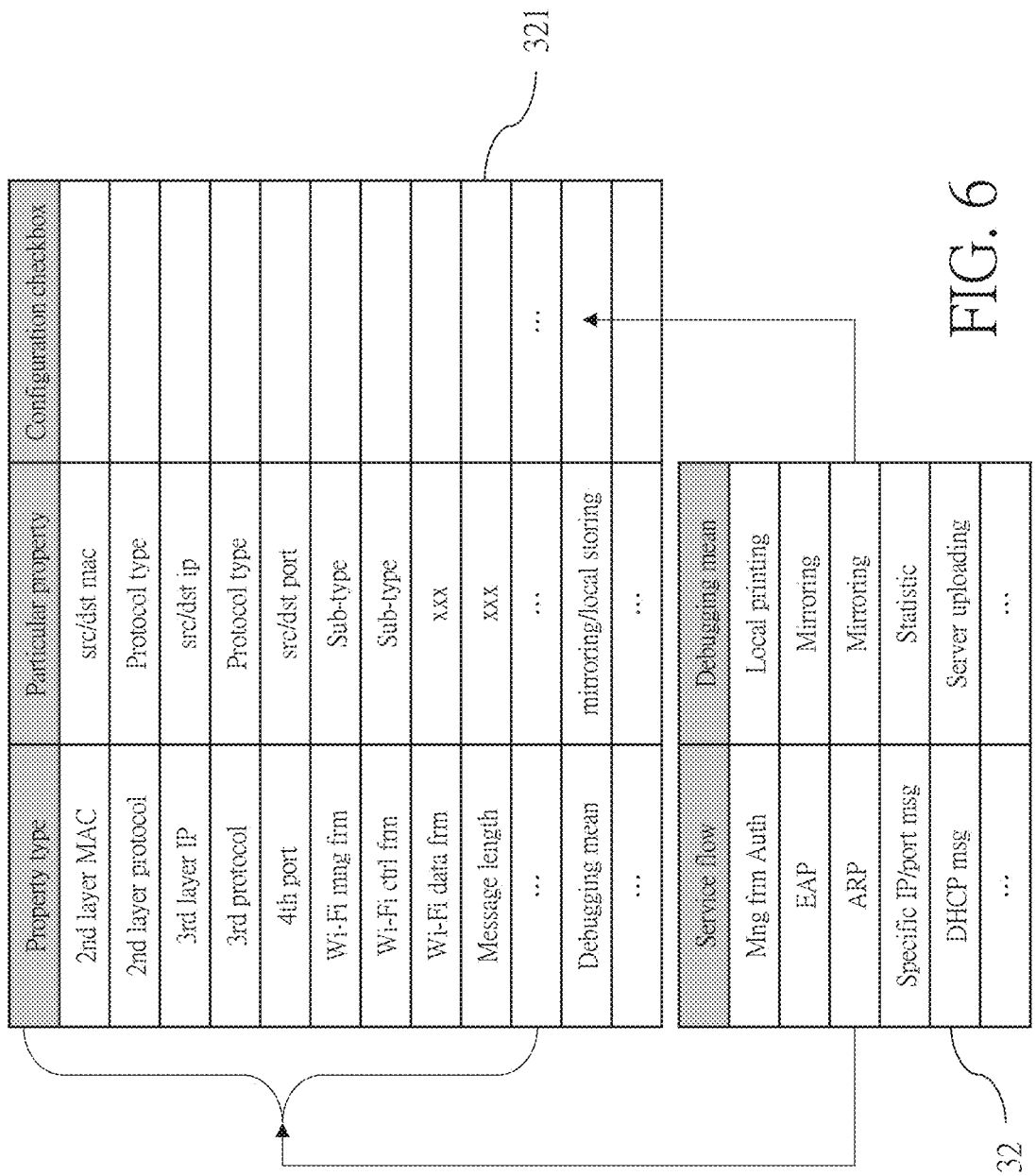
FIG. 6 shows details of the dynamic service flow type association table according to one embodiment of the present invention.

FIG. 6 shows details of the dynamic service flow type association table 32 according to one embodiment of the present invention. In the drawings, "mng" is an abbreviation of "management", "ctrl" is an abbreviation of "control", "frm" is an abbreviation of "frame", and "msg" is an abbreviation of "message".

Referring back to FIG. 3, the debugging system 3 of the present invention involves the service flow matching module 31, the dynamic service flow type association table 32 and the service flow debug execution module 33. The dynamic service flow type association table 32 will be described in details hereinafter.

Firstly, the dynamic service flow type association table 32 in FIG. 6 maps different particular service flows to different debugging means. For example, a "management frame Auth" service flow requires a "local printing" debugging means; an "EAP" service flow requires a mirroring" debugging means; an "ARP" service flow requires a "mirroring" debugging means; a "specific IP/port message" service flow requires a "statistics" debugging means; a "DHCP message" service flow requires a "server uploading" debugging means, but not limited thereto. As previous mentioned, the dynamic service flow type association table 32 may be implemented by internal code programing or data structure, but not limited thereto.

Next, each row in the dynamic service flow type association table 32 can further be expanded into a service property description table 321, as shown in FIG. 6, and the service property description table 321 includes three fields: "property type", "particular property" and "configuration checkbox", wherein the field of property type and the field of configuration checkbox are the fields to be inputted. Referring back to the flowchart in FIG. 4, the service property description table 321 is used in step S4 to match the debug rule required by the determined service flow type with the six embedding points selected on the forwarding path in the Wi-Fi driver. In other words, the debug rule at each embedding point of the six embedding points can be configured by its own service property description table 321.

Regarding inputting a particular property, a message (or generally a data stream) serves as an input parameter that enters into the service flow matching module 31. The service flow matching module 31 analyzes a header of the message, and determines which type the message belongs to and which service flow type the message involves. In this embodiment, property types of 802.11 protocol messages include a second layer MAC, a second layer protocol, a third layer IP, a third layer protocol, a fourth layer port, and so on; property types of 802.3 protocol message include: a Wi-Fi management frame, a Wi-Fi control frame, a Wi-Fi data frame, and so on. They are presented in parallel in the service property description table 321 of the dynamic service flow type association table 32. Therefore, the service property description table 321 can used to deal with both an 802.3 protocol message and an 802.11 protocol message.

Referring to FIG. 5, it is also possible to introduce two separated tables: a "Wi-Fi protocol header rule table" and a "802.3 data matching table" to deal with an 802.11 protocol message and an 802.3 protocol message respectively.

In FIG. 6, a field of a property type of the dynamic service flow type association table 32 has one row called "debugging means". The debugging means serves as an input parameter to be provided to a service flow debug executing module 33. The debugging means mainly include mirroring, local printing or storing, uploading to a cloud server, statistic or speed limiting, modifying a field of priority (such as for vlan pbit, IPv4 DSCP, IPv6 Traffic Class), and so on.

In FIG. 6, the service property description table 321 of the dynamic service flow type association table 32 has a field of "configuration checkbox", which shall be filled in with "Yes" (Y) or "No" (N). Several examples will be descried in details hereinafter.

First Example: Debugging if an ARP Message Suffers Packet Loss on a Transmitting Path TX in the Wi-Fi Module FIG. 7 is a schematic diagram of debugging in a case where an ARP message suffers packet loss on a transmitting path TX in the Wi-Fi module 2 according to a first example of the present invention.

Figure 7:
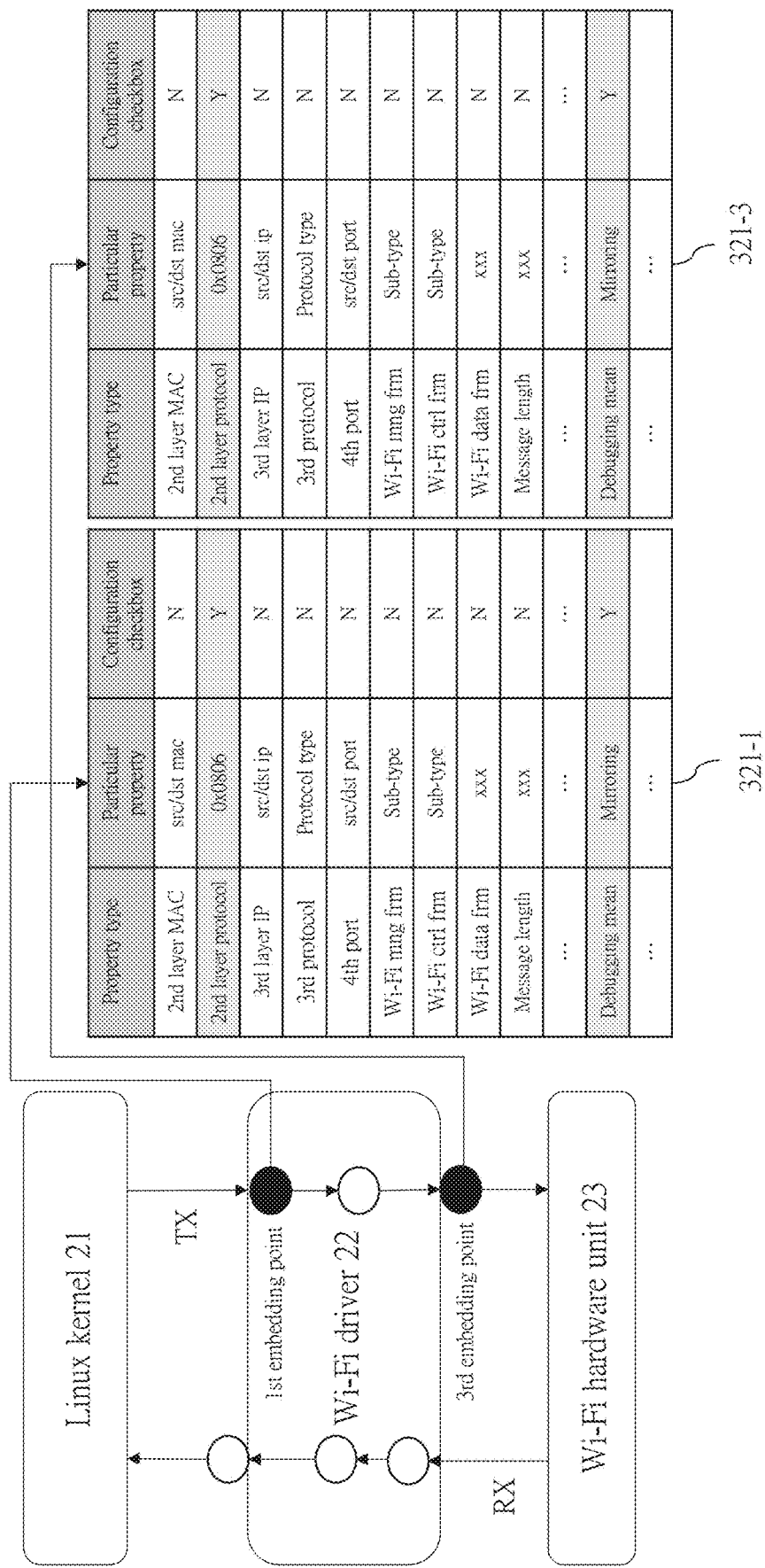
FIG. 7 is a schematic diagram of debugging in a case where an ARP message suffers packet loss on a transmitting path TX in the Wi-Fi module according to a first example of the present invention.

This example concerns the transmitting path TX in the Wi-Fi module 2, and therefore, with reference to FIG. 7, it needs to use the first embedding point connected with the Linux kernel 21 on the transmitting path TX, and the third embedding point connected with the Wi-Fi hardware unit 23 on the transmitting path TX. Referring to FIG. 7, if it needs to analyze whether a packet loss of the ARP message occurs on the transmitting path TX, the first embedding point will need to be configured with a debug rule to "mirror ARP onto LAN" according to the service property description table 321-1. In particular, the particular property of the second layer protocol needs to be set to "0x0806", which represents an ARP message, the field of the configuration checkbox thereof needs to be set to "Yes" (Y), the particular property of the debugging means needs to be set to "mirroring", and the field of the configuration checkbox thereof needs to be set to "Yes" (Y); also, the third embedding point needs to be configured with the same debug rule to "mirror ARP onto LAN" according to the service property description table 321-3, and other configurations are the same as shown in the service property description table 321-1.

In order to execute a practical debug process, with reference to the flowchart in FIG. 4, at first, an ARP message is transmitted from the Linux kernel 21 to the Wi-Fi driver 22, and passes through the first embedding point, and then, the service flow matching module 31 of the debugging system 3 of the present invention analyzes the header of the message (referring to step S1), determines that the message belongs to an ARP message and involves an ARP service flow type (referring to step S2), and looks up the dynamic service flow type association table 32 (referring to step S3), and accordingly configures the first embedding point with a debug rule to "mirror ARP onto LAN" according to the service property description table 321-1; also configures the third embedding point with the same debug rule to "mirror ARP onto LAN" according to the service property description table 321-3 (referring to step S4). Finally, after the first embedding point and the third embedding point are properly configured with their respective debug rules, the service flow debug execution module 33 can execute a corresponding debugging means on the data stream. In this example, if an ARP message presents at the first embedding point, but no ARP message presents at the third embedding point, it can be known that the packet loss of the ARP message occurs in the Wi-Fi driver 22.

Second Example: Analyzing if an IGMP Message Suffers Packet Loss on a Transmitting Path TX in the Wi-Fi Module FIG. 8 is a schematic diagram of debug in a case where an IGMP message suffers packet loss on the transmitting path TX in the Wi-Fi module 2 according to a second example of the present invention.

The previous example of FIG. 7 to debug in a case where an ARP message suffers packet loss on the transmitting path TX in the Wi-Fi module 2. However, the present invention is expandable and applicable to debug for other protocols, such as an Internet Group Management Protocol (IGMP) message.

For debugging an IGMP message, a conventional method in the prior art is to modify a code in the Wi-Fi driver to match with a new protocol, and only in this way can it debug a service flow problem. The present invention is more advantageous than the prior art because the debugging system of the present invention can dynamically configure rules by the dynamic service flow type association table 32 to support a new protocol. In this example, the rules can be dynamically configured according to the two service property description tables 321-1 and 321-3 in FIG. 8, thereby supporting IGMP protocol.

Figure 8:
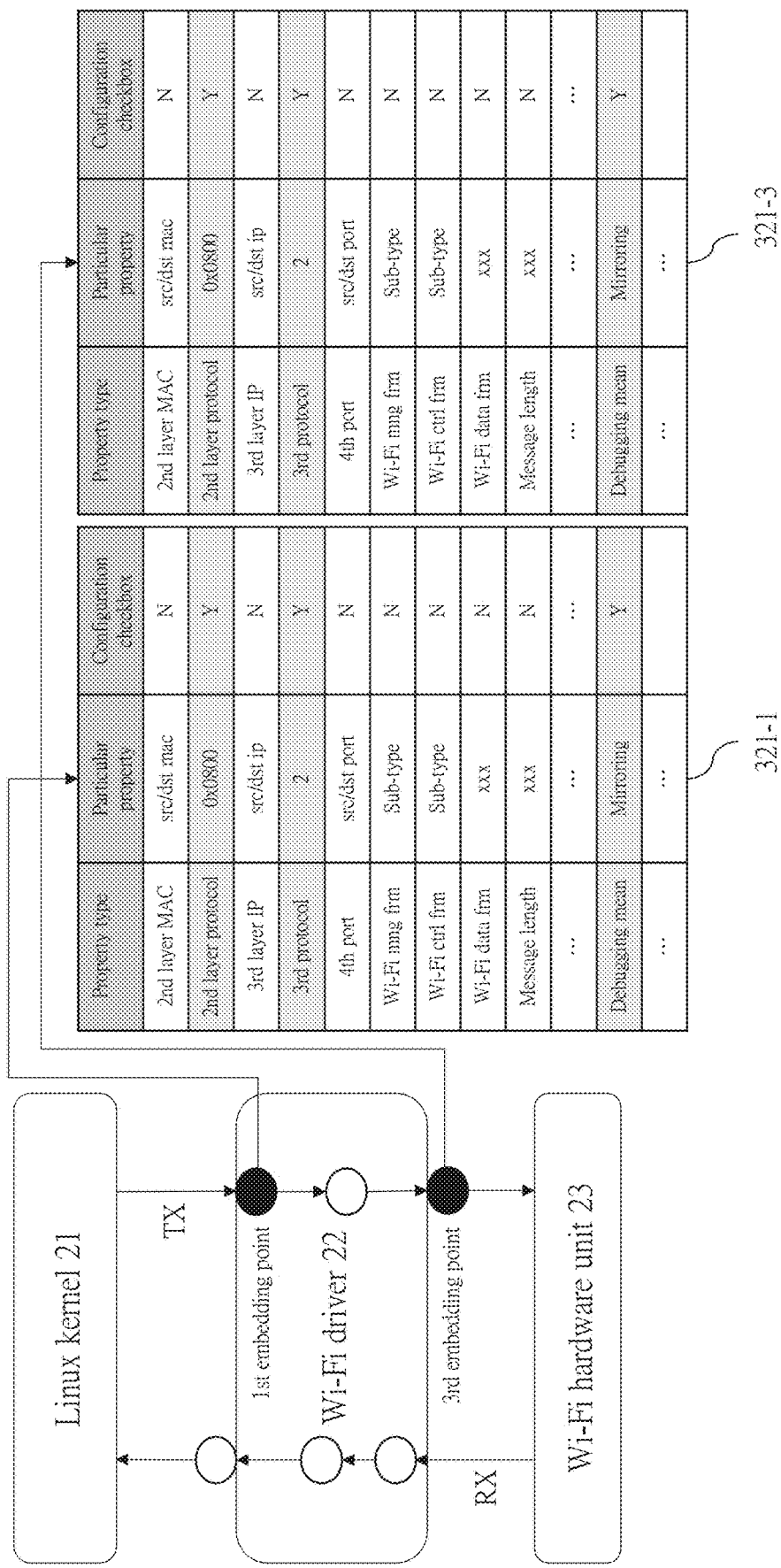
FIG. 8 is a schematic diagram of debugging in a case where an IGMP message suffers packet loss on a transmitting path TX in the Wi-Fi module according to a second example of the present invention.

This example concerns the transmitting path TX in the Wi-Fi module 2, and therefore, with reference to FIG. 8, it needs to use the first embedding point connected with the Linux kernel 21 on the transmitting path TX, and the third embedding point connected with the Wi-Fi hardware unit 23 on the transmitting path TX. Referring to FIG. 8, if it needs to analyze whether a packet loss of the IGMP message occurs, the first embedding point will need to be configured with a first debug rule to "mirror IGMP onto LAN" according to the service property description table 321-1. In particular, the particular property of the second layer protocol needs to be set to "0x0800", which represents an IGMP message, and the field of the configuration checkbox thereof needs to be set to "Yes" (Y), the particular property of the third protocol needs to be set to "2", the field of the configuration checkbox thereof needs to be set to "Yes" (Y), the particular property of the debugging means needs to be set to "mirroring", and the field of the configuration checkbox thereof needs to be set to "Yes" (Y); also, the third embedding point needs to be configured with the same debug rule to "mirror IGMP onto LAN" according to the service property description table 321-3, and other configurations are the same as shown in the service property description table 321-1.

Detailed debug steps in this example may be understood with reference to FIG. 4, and are omitted here.

It can be understood that, in other embodiments, each embedding point may have its own service property description table, and each service property description table may be the same or different, depending on a message type and a required debugging means.

Although the present invention has been explained in relation to its preferred embodiment, it is to be understood that many other possible modifications and variations can be made without departing from the spirit and scope of the invention as hereinafter claimed.

What is claimed is:

1. A debugging system embedded on a forwarding path of a Wireless Fidelity (Wi-Fi) module, comprising:
    a Wi-Fi service flow matching module configured to receive and analyze a message, and determine a Wi-Fi service flow type and a debugging means involving the message for removal of errors of the message according to a dynamic service flow type association table, wherein the dynamic service flow type association table comprises a corresponding Wi-Fi service flow type and a corresponding debugging means involving the message; and
    a service flow debug execution module configured to execute the corresponding debugging means for the message according to a determination result from the Wi-Fi service flow matching module.

2. The debugging system of claim 1, wherein the debugging system is embedded at one or more embedding points selected respectively on a transmitting path or a receiving path in a Wi-Fi driver.

3. The debugging system of claim 2, wherein the one or more embedding points comprise a connecting point with a Linux kernel, a middle point on the forwarding path of the Wi-Fi module, or a connecting point with a Wi-Fi hardware unit.

4. The debugging system of claim 2, wherein the Wi-Fi service flow matching module determines a corresponding service flow involving the message by analyzing a header of the message.

5. The debugging system of claim 2, wherein the Wi-Fi service flow matching module looks up the dynamic service flow type association table, and accordingly matches a debug rule required by the Wi-Fi service flow type with the one or more embedding points.

6. The debugging system of claim 5, wherein the message is an 802.11 protocol message or an 802.3 protocol message; looking up the dynamic service flow type association table comprises looking up a Wi-Fi protocol header rule table for the 802.11 protocol message, and accordingly analyzing and obtaining sub-types of a management frame and a control frame and an Extensible Authentication Protocol (EAP) message of a data frame thereof; and looking up an 802.3 data matching table for the 802.3 protocol message, and accordingly analyzing headers of a second layer (Media Access Control (MAC) layer), a third layer (Internet Protocol (IP) layer), and a fourth layer (Transmission Control Protocol/User Datagram Protocol (TCP/UDP) layer) thereof.

7. The debugging system of claim 5, wherein the dynamic service flow type association table maps the service flow involving the message to a required debugging means, such mapping comprising: mapping a management frame Authentication (Auth) service flow to a local printing debugging means; mapping an Extensible Authentication Protocol (EAP) service flow to a mirroring debugging means; mapping an Address Resolution Protocol (ARP) service flow to a mirroring debugging means; mapping a specific IP/port message service flow to a statistics debugging means; or mapping a Dynamic Host Configuration Protocol (DHCP) message service flow to a server uploading debugging means.

8. The debugging system of claim 2, wherein the dynamic service flow type association table is expanded to be a service property description table, and the service property description table comprises three fields for a property type, a particular property and a configuration checkbox.

9. The debugging system of claim 8, wherein a debug rule at each embedding point of the one or more embedding points is configured by a corresponding service property description table.

10. The debugging system of claim 8, wherein in the service property description table, property types associated with the 802.3 protocol message comprise: a second layer MAC, a second layer protocol, a third layer IP, a third layer protocol, or a fourth layer port; property types associated with the 802.11 protocol message comprise: a Wi-Fi management frame, a Wi-Fi control frame, or a Wi-Fi data frame.

11. A debugging method, comprising:
    embedding a debugging system on a forwarding path of Wireless Fidelity (Wi-Fi) module, wherein the debugging system comprises a Wi-Fi service flow matching module and a service flow debug execution module;
    receiving and analyzing the message by the Wi-Fi service flow matching module, and determining a Wi-Fi service flow type and a debugging means involving the message for removal of errors of the message according to a dynamic service flow type association table, wherein the dynamic service flow type association table comprises a corresponding Wi-Fi service flow type and a corresponding debugging means involving the message; and
    executing the corresponding debugging means for the message by the service flow debug execution module according to a determination result from the Wi-Fi service flow matching module.

12. The debugging method of claim 11, wherein the debugging system is embedded at one or more embedding points selected respectively on a transmitting path or a receiving path in a Wi-Fi driver.

13. The debugging method of claim 12, wherein the Wi-Fi service flow matching module determines a corresponding service flow involving the message by analyzing a header of the message.

14. The debugging method of claim 12, wherein the Wi-Fi service flow matching module looks up the dynamic service flow type association table, and accordingly matches a debug rule required by the Wi-Fi service flow type with the one or more embedding points.

* * * * *